(12) United States Patent
Li et al.

(10) Patent No.: US 12,413,799 B2
(45) Date of Patent: *Sep. 9, 2025

(54) VIDEO STREAM PLAYING CONTROL METHOD AND APPARATUS, AND STORAGE MEDIUM

(71) Applicant: BEIJING BYTEDANCE NETWORK TECHNOLOGY CO., LTD., Beijing (CN)

(72) Inventors: Xinyi Li, Beijing (CN); Ye Lin, Beijing (CN); Min Zhu, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,367

(22) Filed: Dec. 28, 2023

(65) Prior Publication Data

US 2024/0214618 A1    Jun. 27, 2024

Related U.S. Application Data

(63) Continuation of application No. 17/886,989, filed on Aug. 12, 2022, now Pat. No. 11,889,135, which is a (Continued)

(30) Foreign Application Priority Data

Apr. 13, 2020    (CN) .......................... 202010287736.7

(51) Int. Cl.
*H04N 21/239* (2011.01)
*H04N 21/466* (2011.01)

(52) U.S. Cl.
CPC ....... *H04N 21/239* (2013.01); *H04N 21/4668* (2013.01)

(58) Field of Classification Search
CPC ......................... H04N 21/239; H04N 21/4668
See application file for complete search history.

(56) References Cited

U.S. PATENT DOCUMENTS 10,075,771 B1 *   9/2018   Jeon ................... H04N 21/8153
10,616,625 B2     4/2020   Huang et al.
(Continued)

FOREIGN PATENT DOCUMENTS

CN          102685565 A         9/2012
CN          105095431 A         11/2015
(Continued)

OTHER PUBLICATIONS

International Patent Application No. PCT/CN2021/077971; Int'l Search Report; dated May 17, 2021; 2 pages.
(Continued)

*Primary Examiner* — Nnenna N Ekpo
(74) *Attorney, Agent, or Firm* — BakerHostetler

(57) ABSTRACT

Embodiments of the present application provide a video stream playing control method and apparatus, a device, and a storage medium. The method comprises: in a situation that a human-computer interaction entrance invoking triggering condition is satisfied, stopping playing a first video stream, and invoking a human-computer interaction entrance for the first video stream while displaying a playing picture of the first video stream; after target feedback information is obtained by means of the human-computer interaction entrance or an instruction for closing the human-computer interaction entrance is received, closing the human-computer interaction entrance, and playing a second video stream different from the first video stream, the target feedback information comprising feedback information for the first video stream.

20 Claims, 4 Drawing Sheets

Related U.S. Application Data continuation of application No. PCT/CN2021/077971, filed on Feb. 25, 2021.

(56) References Cited

U.S. PATENT DOCUMENTS

| | | | |
|---|---|---|---|
| 2003/0023757 A1* | 1/2003 | Ishioka | H04N 21/8456 348/E7.071 |
| 2008/0086742 A1 | 4/2008 | Aldrey et al. | |
| 2014/0226953 A1 | 8/2014 | Hou | |
| 2017/0289617 A1 | 10/2017 | Song et al. | |
| 2019/0163752 A1 | 5/2019 | Barlaskar et al. | |
| 2020/0077137 A1 | 3/2020 | Ji et al. | |
| 2020/0236212 A1* | 7/2020 | Vinna | G06F 16/639 |
| 2021/0168473 A1 | 6/2021 | Li | |
| 2021/0235156 A1* | 7/2021 | Richman | G06F 3/04842 |

FOREIGN PATENT DOCUMENTS

| | | |
|---|---|---|
| CN | 106060637 A | 10/2016 |
| CN | 107748759 A | 3/2018 |
| CN | 108184145 A | 6/2018 |
| CN | 108521589 A | 9/2018 |
| CN | 109168047 A | 1/2019 |
| CN | 109547835 A | 3/2019 |
| CN | 109788322 A | 5/2019 |
| CN | 109819284 A | 5/2019 |
| CN | 109996122 A | 7/2019 |
| CN | 110069991 A | 7/2019 |
| CN | 110248241 A | 9/2019 |
| CN | 110798744 A | 2/2020 |
| CN | 110868639 A | 3/2020 |
| CN | 110971973 A | 4/2020 |
| CN | 111447239 A | 7/2020 |
| EP | 3021594 A1 | 5/2016 |
| JP | 2003-032660 A | 1/2003 |
| JP | 2003-061065 A | 2/2003 |
| JP | 2008048091 A | 2/2008 |
| JP | 2009-110399 A | 5/2009 |
| JP | 2014-036232 A | 2/2014 |
| KR | 2014-0107985 A | 9/2014 |
| WO | WO 2019/109643 A1 | 6/2019 |

OTHER PUBLICATIONS

European Patent Application No. 21788885.8; Extended Search Report; dated May 24, 2023; 10 pages.
Indian Office Action from Indian Patent Application No. 202227063720, dated Jan. 30, 2023, 7 pages.
Decision of Refusal for Japanese Application No. 2022-562293, mailed Oct. 8, 2024, 13 pages.
Written Opinion for International Application No. PCT/CN2021/077971, mailed May 17, 2021, 09 Pages.

* cited by examiner

VIDEO STREAM PLAYING CONTROL METHOD AND APPARATUS, AND STORAGE MEDIUM

CROSS REFERENCE OF RELATED APPLICATION

The present application is a continuation of U.S. patent application Ser. No. 17/886,989 filed on Aug. 12, 2022, which is a continuation application of International Patent Application No. PCT/CN2021/077971, titled "VIDEO STREAM PLAYING CONTROL METHOD AND APPARATUS, AND STORAGE MEDIUM", filed on Feb. 25, 2021, which claims priority to Chinese Patent Application No. 202010287736.7, titled "VIDEO STREAM PLAYING CONTROL METHOD AND APPARATUS, AND STORAGE MEDIUM", filed on Apr. 13, 2020 with the China National Intellectual Property Administration, all of which are incorporated herein by reference in their entireties.

FIELD

Embodiments of the present disclosure relate to the technical field of video stream control, and in particular to a method for controlling playing of a video stream, a device, and a storage medium.

BACKGROUND

With the development of Internet technology, video stream application programs running on terminal devices are widely used. In the conventional technology, feedback information such as satisfaction of a user on the video stream is generally collected based on whether the user completely watches the video stream. However, this kind of feedback information is low in accuracy, and is not fully utilized in the conventional technology.

SUMMARY

A method for controlling playing of a video stream, a device, and a storage medium are provided according to embodiments of the present disclosure, so as to pertinently and accurately acquire user feedback on the video stream that is currently played, and avoid affecting the video playing effect due to a human-computer interaction interface blocking the playing video stream.

In a first aspect, a method for controlling playing of a video stream is provided according to an embodiment of the present disclosure. The method includes: stopping playing a first video stream when a trigger condition for invoking a human-computer interaction portal is satisfied, and invoking the human-computer interaction portal for the first video stream while displaying a playing window of the first video stream; and closing the human-computer interaction portal and playing a second video stream different from the first video stream on receipt of target feedback information through the human-computer interaction portal or on receipt of an instruction to close the human-computer interaction portal. The target feedback information includes feedback information about the first video stream.

In the method according to the embodiment of the present disclosure, the human-computer interaction portal for the first video stream is invoked while displaying the playing window of the first video stream, to acquire feedback information, so as to accurately and pertinently acquire the user feedback on the first video stream that is currently played. Moreover, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

Optionally, the second video stream different from the first video stream may be played in a manner that includes but is not limited to, automatically playing the second video stream in response to acquisition of the target feedback information or in response to the instruction to close the human-computer interaction portal.

In the method according to the embodiment of the present disclosure, the video stream is resumed playing in response to the acquisition of the target feedback information or the instruction to close the human-computer interaction portal. That is, the application automatically plays the second video stream after the user inputs the target feedback information or closes the human-computer interaction portal, thereby achieving a seamless transition between human-computer interaction and automatic continuation of playing as well as improving the smoothness of video playing.

On the basis of any one of the described method embodiments, the second video stream played and/or at least one video stream to be played is determined based on the target feedback information.

In the method according to the embodiment of the present disclosure, the video stream recommendation is performed in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

In addition, in the method according to the embodiment of the present disclosure, it is necessary to acquire richer feedback content in order to make video stream recommendation in real time based on the target feedback information. For example, multiple feedback questions are set or multiple options are set for a feedback question, which requires a relatively larger display area. As described above, in the method according to the embodiment of the present disclosure, the playing of the video stream is stopped when the human-computer interaction portal is invoked. Therefore, in the case where the human-computer interaction portal is a human-computer interaction interface, the playing effect of the video stream is not affected by blocking the video stream being played even if a relatively large human-computer interaction interface is displayed.

On the basis of any one of the method embodiments, the trigger condition for invoking the human-computer interaction portal may include at least one of: a video stream switching instruction is received; the number of times that the first video stream is played repeatedly reaches a threshold; playing of the first video stream is finished already; a specific target object is detected during the playing of the first video stream; and the first video stream is played to a certain time instant.

In practice, the method according to the embodiment of the present disclosure supports flexible configuration of the trigger condition for invoking the human-computer interaction portal, so as to meet product requirements.

In one embodiment, the terminal device may configure the received video stream switching instruction as the trigger condition for invoking the human-computer interaction portal. When receiving the video stream switching instruction, the terminal device invokes the human-computer interaction portal in response to the instruction. This implementation manner of invoking the human-computer interaction portal does not interrupt the first video stream being played, thereby reducing the interference to the playing of the video stream.

In one embodiment, the terminal device may configure the completion of playing the first video stream as the trigger condition for invoking the human-computer interaction portal. When the playing of the first video stream is finished, the terminal device invokes the human-computer interaction portal. This implementation of invoking the human-computer interaction portal does not interrupt the first video stream being played, thereby reducing the interference to the playing of the video stream.

Taking a short video playing application as an example, in a non-automatic playing mode, the playing control process of a video stream is commonly as follows. If no video stream switching instruction is detected, the current video stream is played repeatedly. When a video stream switching instruction is detected, the current video stream is switched to a next video stream. For the scenario where the current video stream is played repeatedly with no video stream switching instruction being received, the repetition of the current video stream may be resulted from that the user attention is diverted and the user forgets to switch or close the video stream rather than means that the user is more interested in the content of the video stream. In this case, in one embodiment, the terminal device may configure the number of repetitions of the first video stream reaching the threshold as the trigger condition for invoking the human-computer interaction portal. If the number of times that the first video stream is played repeatedly reaches the threshold, the terminal device requests the user feedback information about the video stream by invoking the human-computer interaction portal. This can not only improve the accuracy of the feedback information, but also improve the accuracy of subsequent use of the feedback information, for example, improve the accuracy of video stream recommendation based on the feedback information provided by the user.

In a second aspect, a terminal device is provided according to an embodiment of the present disclosure. The terminal device may include a first playing control module and a second playing control module.

The first playing control module is configured to stop playing a first video stream when a trigger condition for invoking a human-computer interaction portal is satisfied, and invoke the human-computer interaction portal for the first video stream while displaying the playing window of the first video stream.

The second playing control module is configured to close the human-computer interaction portal and play a second video stream different from the first video stream on receipt of a target feedback information through the human-computer interaction portal or an instruction to close the human-computer interaction portal. The target feedback information includes feedback information about the first video stream.

With the terminal device according to the embodiment of the present disclosure, the human-computer interaction portal for the first video stream is invoked while the playing window of the first video stream is displayed, to acquire feedback information, so as to accurately and pertinently acquire the user feedback on the first video stream that is currently played. Moreover, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

Optionally, the second playing control module plays the second video stream different from the first video stream in a manner that includes, but is not limited to, automatically playing the second video stream in response to acquisition of the target feedback information or in response to the instruction to close the human-computer interaction portal.

The terminal device according to the embodiment of the present disclosure resumes playing the video stream in response to the acquisition of the target feedback information or the instruction to close the human-computer interaction portal. That is, the application automatically plays the second video stream after the user inputs the target feedback information or closes the human-computer interaction portal without manual trigger by the user, thereby achieving a seamless transition between human-computer interaction and automatic continuation of playing as well as improving the smoothness of video playing.

On the basis of any one of the described terminal device embodiments, the second video stream played and/or at least one video stream played is determined based on the target feedback information.

The terminal device according to the embodiment of the present disclosure performs video stream recommendation in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

In addition, with the terminal device according to the embodiment of the present disclosure, it is necessary to acquire richer feedback content in order to make video stream recommendation in real time based on the target feedback information. For example, multiple feedback questions are set or multiple options are set for a feedback question, which requires a relatively larger display area. As described above, with the terminal device according to the embodiment of the present disclosure, the playing of the video stream is stopped when the human-computer interaction portal is invoked. Therefore, in the case where the human-computer interaction portal is a human-computer interaction interface, the playing effect of the video stream is not affected by blocking the video stream being played even if a relatively large human-computer interaction interface is displayed.

On the basis of any one of the terminal device embodiments, the trigger condition for invoking the human-computer interaction portal may include at least one of: a video stream switching instruction is received; the number of times that the first video stream is played repeatedly reaches a threshold; playing of the first video stream is finished already; a specific target object is detected during the playing of the first video stream; and the first video stream is played to a certain time instant.

In practice, the terminal device according to the embodiment of the present disclosure supports flexible configuration of the trigger condition for invoking the human-computer interaction portal, so as to meet product requirements.

In one embodiment, the terminal device may configure the received video stream switching instruction as the trigger condition for invoking the human-computer interaction portal. When receiving the video stream switching instruction, the terminal device invokes the human-computer interaction portal in response to the instruction. This implementation manner of invoking the human-computer interaction portal does not interrupt the first video stream being played, thereby reducing the interference to the playing of the video stream.

In one embodiment, the terminal device may configure the completion of playing the first video stream as the trigger condition for invoking the human-computer interaction portal. When the playing of the first video stream is finished, the terminal device invokes the human-computer interaction portal. This implementation of invoking the human-computer interaction portal does not interrupt the first video stream being played, thereby reducing the interference to the playing of the video stream.

Taking a short video playing application as an example, in the non-automatic playing mode, the playing control process of a video stream is commonly as follows. If no video stream switching instruction is detected, the current video stream is played repeatedly. When a video stream switching instruction is detected, the current video stream is switched to a next video stream. For the scenario where the current video stream is played repeatedly with no video stream switching instruction being received, the repetition of the current video stream may be resulted from that the user attention is diverted and the user forgets to switch or close the video stream rather than means that the user is more interested in the content of the video stream. In this case, in one embodiment, the terminal device may configure the number of repetitions of the first video stream reaching the threshold as the trigger condition for invoking the human-computer interaction portal. If the number of times that the first video stream is played repeatedly reaches the threshold, the terminal device requests the user feedback information about the video stream by invoking the human-computer interaction portal. This can not only improve the accuracy of the feedback information, but also improve the accuracy of subsequent use of the feedback information, for example, improve the accuracy of video stream recommendation based on the feedback information provided by the user.

In a third aspect, an electronic device is provided according to an embodiment of the present disclosure. The electronic device includes a processor and a memory. The memory is configured to store a program for implementing the method described in the various method embodiments of the first aspect. The processor is configured to execute the program stored in the memory.

With the electronic device according to the embodiment of the present disclosure, the human-computer interaction portal for the first video stream is invoked while the playing window of the first video stream is displayed, to acquire feedback information, so as to accurately and pertinently acquire the user feedback on the first video stream that is currently played. Moreover, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

In a fourth aspect, a computer-readable storage medium is provided according to an embodiment of the present disclosure. The computer-readable storage medium stores a program for implementing the method described in the various embodiments of the first aspect.

With the program stored in the computer-readable storage medium according to the embodiment of the present disclosure, the human-computer interaction portal for the first video stream is invoked while the playing window of the first video stream is displayed, to acquire feedback information, so as to accurately and pertinently acquire the user feedback on the first video stream that is currently played. Moreover, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

With the method for controlling playing of a video stream, the device and the storage medium according to the embodiments of the present disclosure, video stream recommendation is performed in real time based on the target feedback information.

In a fifth aspect, a video stream playback control method is provided according to an embodiment of the present disclosure. The method includes: invoking a human-computer interaction portal for a first video stream that is currently played when the trigger condition for invoking the human-computer interaction portal is satisfied, so as to acquire target feedback information through the human-computer interaction portal, where the target feedback information includes feedback information about the first video stream; and playing a second video stream different from the first video stream after the target feedback information is acquired. The second video stream and/or at least one video stream to be played is determined based on the target feedback information.

With the method according to the embodiment of the present disclosure, the target feedback information can be acquired accurately and pertinently, and the video stream recommendation can be performed in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

Optionally, the playing, after the target feedback information is acquired, the second video stream different from the first video stream in a manner that includes but is not limited to, automatically playing the second video stream in response to acquisition of the target feedback information.

In method according to the embodiment of the present disclosure, the second video stream is automatically played in response to acquisition of the target feedback information, which can realize seamless transition between the human-computer interaction and the operation of automatically playing the video stream, and improve the smoothness of video playing. Moreover, in a case that the second video stream is determined based on the target feedback information, the user feedback can be quickly responded according to the embodiments of the present disclosure, thereby further improving the user experience.

Optionally, in the method according to the embodiment of the present disclosure, the first video stream is stopped playing when the trigger condition for invoking the human-computer interaction portal is satisfied. Correspondingly, the implementation of invoking the human-computer interaction portal may include invoking the human-computer interaction portal while displaying the playing window of the first video stream. In addition, after receiving the instruction to close the human-computer interaction portal, the human-computer interaction portal is closed, and the second video stream is played.

In the method according to the embodiment of the present disclosure, the human-computer interaction portal for the first video stream is invoked to acquire feedback information while displaying the playing window of the first video stream, so as to accurately and pertinently acquire the user feedback on the first video stream that is currently played. In addition, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

In a sixth aspect, a terminal device is provided in real time according to the present disclosure. The terminal device includes a human-computer interaction portal invocation module and a video stream playing module.

The human-computer interaction portal invocation module is configured to invoke a human-computer interaction portal for a first video stream that is currently played when the trigger condition for invoking the human-computer interaction portal is satisfied, so as to acquire target feedback information through a human-computer interaction interface. The target feedback information includes feedback information about the first video stream. The video stream playing module is configured to play a second video stream different from the first video stream after the target feedback information is acquired. The second video stream and/or at least one video stream to be played is determined based on the target feedback information.

The terminal device according to the embodiment of the present disclosure can acquire the target feedback information accurately and pertinently, and perform the video stream recommendation in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

Optionally, the video stream playing module plays the second video stream different from the first video stream after the target feedback information is acquired in a manner including but not limited to: automatically playing the second video stream in response to acquisition of the target feedback information.

The terminal device according to the embodiment of the present disclosure automatically plays the second video stream in response to acquisition of the target feedback information, which can realize seamless transition between the human-computer interaction and the operation of automatically playing the video stream, and improve the smoothness of video playing. Moreover, in a case that the second video stream is determined based on the target feedback information, the user feedback can be quickly responded according to the embodiments of the present disclosure, thereby further improving the user experience.

Optionally, the video stream playing module further stops playing the first video stream when the trigger condition for invoking the human-computer interaction portal is satisfied. Correspondingly, the implementation manner of invoking the human-computer interaction portal by the human-computer interaction portal invocation module may include invoking the human-computer interaction portal while the playing window of the first video stream is displayed. In addition, after receiving the instruction to close the human-computer interaction portal, the human-computer interaction portal vocation module closes the human-computer interaction portal, and the video stream playing module plays the second video stream. The target feedback information includes feedback information about the first video stream.

The terminal device according to the embodiment of the present disclosure stops playing the video stream (i.e., stops playing the first video stream) during the process of invoking the human-computer interaction portal, and automatically resumes playing the video stream (i.e., plays the second video stream) after closing the human-computer interaction portal. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

In a seventh aspect, an electronic device is further provided according to an embodiment of the present disclosure. The electronic device includes a processor and a memory. The memory is configured to store a program for implementing the method described in the various method embodiments of the fifth aspect. The processor is configured to execute the program stored in the memory.

The electronic device according to the embodiment of the present disclosure can acquire the target feedback information accurately and pertinently, and perform the video stream recommendation in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

In an eighth aspect, a computer-readable storage medium is further provided according to an embodiment of the present disclosure. The computer-readable storage medium stores a program for implementing the method described in the various embodiments of the fifth aspect.

With the program stored in the computer-readable storage medium according to the embodiment of the present disclosure, the target feedback information can be acquired accurately and pertinently, and the video stream recommendation can be performed in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

DETAILED DESCRIPTION OF EMBODIMENTS

In order to better understand the above technical solutions, the technical solutions of the embodiments of the present disclosure are described in detail below through the drawings and specific embodiments. It should be understood that the embodiments of the present disclosure and the drawings in the embodiments are detailed descriptions of the technical solutions of the embodiments of the present disclosure, rather than limitations of the technical solutions of the present disclosure. In the case of no conflict, the embodiments of the present disclosure and the technical features in the embodiments may be combined with each other.

A method for controlling playing of a video stream is provided according to an embodiment of the present disclosure, and is suitable for video playing scenarios in which video data is streamed, including but not limited to, a short video playing scenario, a long video playing scenario, a live video scenario, and the like. The video stream includes video data for data transmission by means of streaming. A manner in which the video stream is segment is not limited herein. In practice, segmentation of the video stream is defined according to product requirements, so as to distinguish a first video stream, a second video stream, and so on. In an example rather than a limitation, in the scenario of playing a fixed-length video file (including a short video or other forms of video), a video file may be defined as a video stream. Alternatively, a video file is divided into several video clips in a predetermined manner (for example, a movie video file may be divided into several video clips according to development of the plot), and each video clip serves as a video stream. In a live video scenario, the entire video playing process may be divided into multiple video clips according to the live content or duration, and each video clip serves as a video stream.

Figure 1:
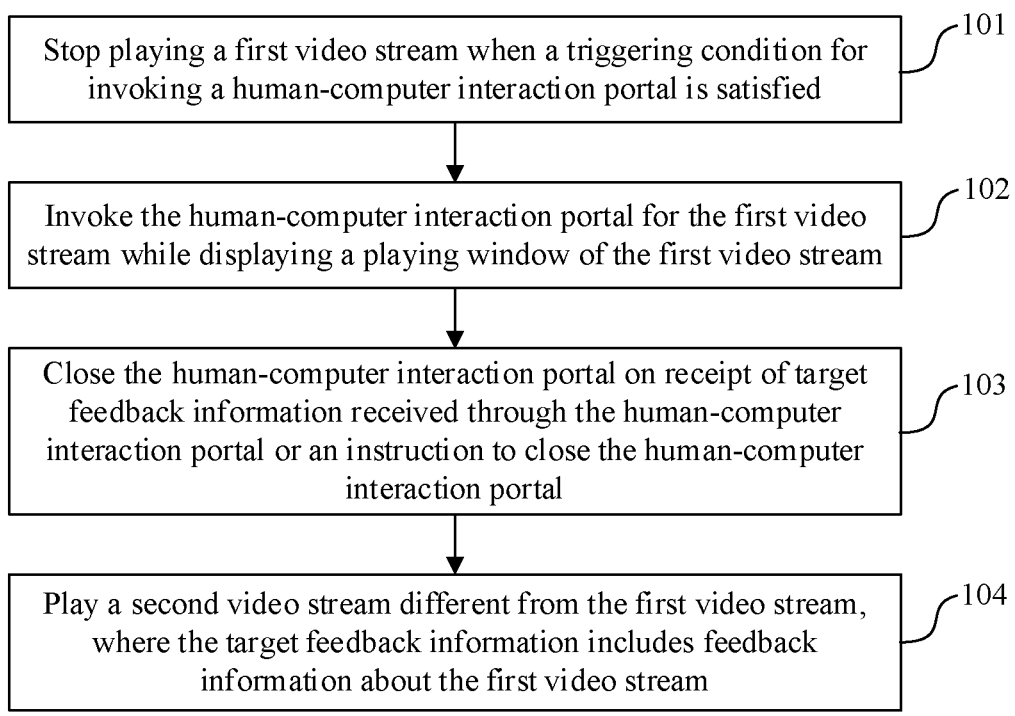
FIG. 1 is a flowchart illustrating a method for controlling playing of a video stream according to an embodiment of the present disclosure.

The method for controlling playing of a video according to the embodiment of the present disclosure may be implemented by a terminal device installed with a browser or a video stream playing application. As shown in FIG. 1, the method includes the following steps 101 to 104.

In step 101, the first video stream is stopped playing when a trigger condition for invoking a human-computer interaction portal is satisfied.

In step 102, the human-computer interaction portal is invoked while a playing window of the first video stream is displayed.

Although in the above description, invoking the human-computer interaction portal is executed under the condition that the trigger condition for invoking the human-computer interaction portal is satisfied, the embodiment of the present disclosure does not limit the sequence of stopping playing the first video stream and invoking the human-computer interaction portal. In practice, the user generally does not perceive the sequence of stopping playing the first video stream and invoking the human-computer interaction portal.

The human-computer interaction portal includes, but is not limited to, at least one of: a human-computer interaction interface and a human-computer interaction voice module. The human-computer interaction voice module is capable of at least playing a voice and acquiring a voice, and further capable of voice recognition or sending a collected voice signal and acquiring a voice recognition result.

In practice, the trigger condition for invoking the human-computer interaction portal is flexibly configured according to the product requirements.

In step 103, the human-computer interaction portal is closed on receipt of target feedback information received through the human-computer interaction portal or an instruction to close the human-computer interaction portal.

In step 104, a second video stream different from the first video stream is played. The target feedback information includes feedback information about the first video stream.

In the above description, the second video stream is played after acquiring the target feedback information through the human-computer interaction portal or receiving an instruction to close the human-computer interaction portal. However, the embodiment of the present disclosure does not limit the sequence of playing the second video stream and closing the human-computer interaction portal. In practice, the user generally does not perceive the sequence of playing the second video stream and closing the human-computer interaction portal.

Figure 2:
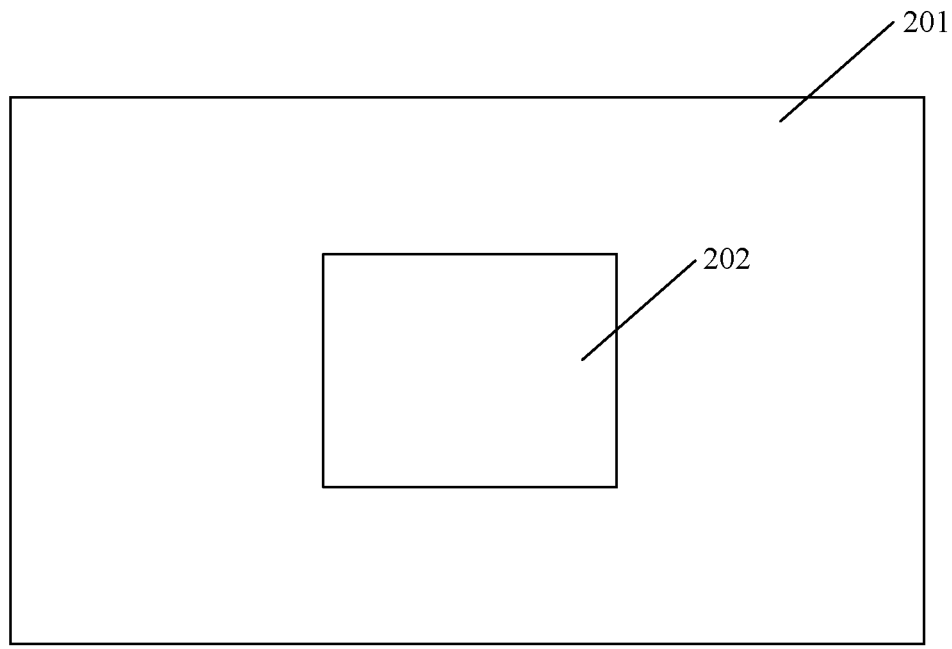
FIG. 2 is a schematic diagram illustrating display of a human-computer interaction interface and a video stream playing window interface according to an embodiment of the present disclosure.
Figure 3A:
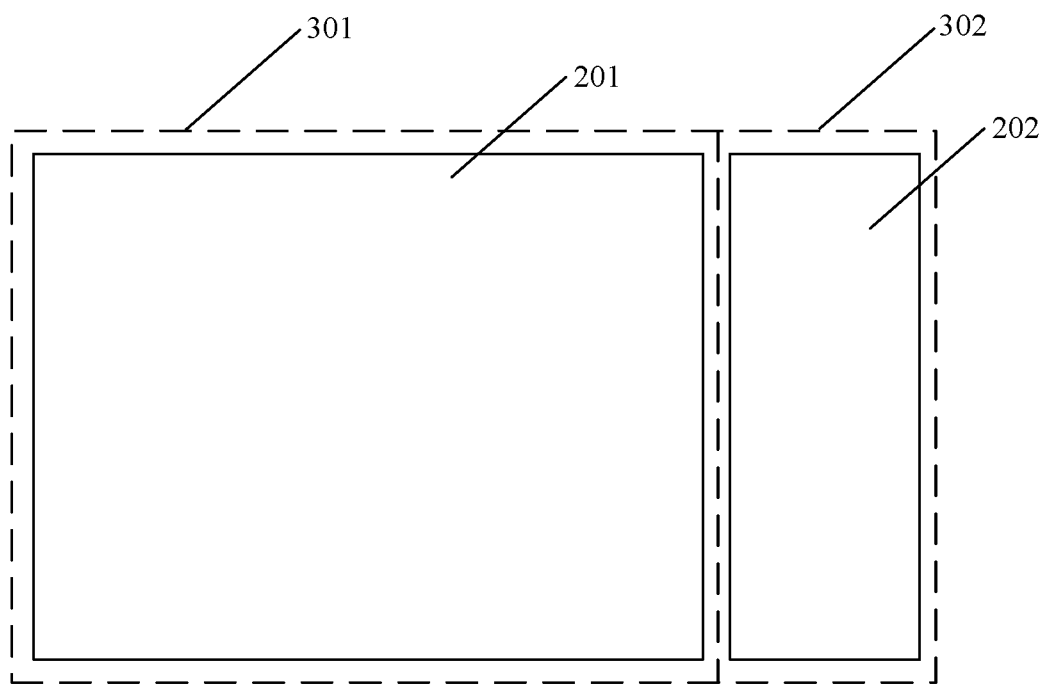
FIG. 3A is a schematic diagram illustrating display of the human-computer interaction interface and the video stream playing window interface according to another embodiment of the present disclosure.

In a case that the human-computer interaction portal is a human-computer interaction interface, the implementation of invoking the human-computer interaction portal while displaying a playing window of the first video stream includes but is not limited to: displaying the human-computer interaction interface 202 on a video stream playing window interface 201 as shown in FIG. 2, or displaying the video stream playing window interface 201 in a first display area 301 after being compressed (equally or unequally) and displaying the human-computer interaction interface 202 in a second display area 302 as shown in FIG. 3. A display area of the terminal device includes the first display area 301 and the second display area 302. The playing window (not shown in the drawings) of the first video stream is displayed in the video stream playing window interface of the browser or application. Therefore, the playing window (not shown in the drawings) of the first video stream is compressed along with the compression of the video stream playing window interface 201.

Figure 3B:
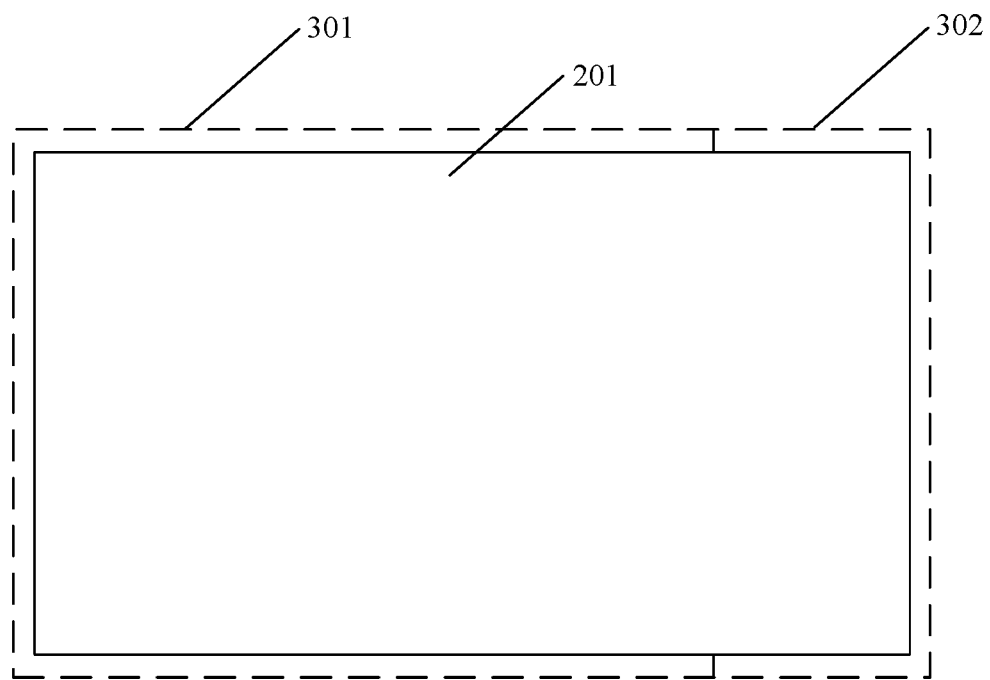
FIG. 3B is a schematic diagram illustrating display of the video stream playing window interface after a display ratio is restored according to another embodiment of the present disclosure.

In a case that the video stream playing window interface is compressed and displayed during the displaying of the human-computer interaction interface, the display ratio of the video stream playing window interface 201 is restored when the second video stream is played as shown in FIG. 3B. That is, the display ratio of the playing window (not shown in the drawings) of the second video stream is restored.

The second video stream may be automatically played immediately after the target feedback information is acquired or the instruction to close the human-computer interaction portal is received. Alternatively, after the target feedback information is acquired or the instruction to close the human-computer interaction portal is received, the second video stream is played in response to a video stream playing instruction.

In the method according to the embodiment of the present disclosure, the human-computer interaction portal for the first video stream is invoked while displaying the playing window of the first video stream, to acquire feedback information, so as to accurately and pertinently acquire the user feedback on the first video stream that is currently played. Moreover, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple. Additionally, the playing window is not closed or jumped. Therefore, it is unnecessary to open or jump to the playing window in order to display the second video stream, which ensures smoothness of playing the video stream.

In practice, there are many ways to acquire the target feedback information through the human-computer interaction portal. In one implementation, the human-computer interaction portal includes a human-computer interaction interface. On the human-computer interaction interface, feedback request information for the first video stream is displayed, and a target feedback information input control is also displayed. The target feedback information is acquired through the target feedback information input control. The target feedback information input control may be a text box control, a selection control, a voice signal acquisition control, an image acquisition control, and the like.

The embodiments of the present disclosure do not limit the specific content and expression form of the feedback request information. The expression form of the feedback request information may include a graphic control, a text control, a selection control and so on. The content of the target feedback information may include, but is not limited to, a request to rate the first video stream, a question about whether the first video stream is interested, an investigation into the playing fluency of the first video stream, an investigation of the playing quality of the first video stream, and so on, which is not limited herein.

In practice, after the terminal invokes the human-computer interaction portal, the user may refuse to input a target feedback information. In an example rather than a limitation, in the case that the user performs the behavior of refusing to input the target feedback information, the terminal device generates an instruction to close the human-computer interaction portal in response to the user behavior. The video streaming browser or application closes the human-computer interaction portal in response to the instruction. In one implementation, for example, the human-machine interaction portal includes a human-machine interaction interface on which feedback request information for the first video stream is displayed, and a control indicating to close the interface and a control indicating to ignore the feedback request information are also displayed. If the user has an action that triggers the control indicating to close the interface or an action that triggers the control indicating to ignore the feedback request information, the trigger action serves as an instruction to close the human-computer interaction portal. Alternatively, the terminal device generates an instruction to close the human-computer interaction portal in response to the trigger action. The video streaming browser or application closes the human-computer interaction interface in response to the instruction. In another implementation, for example, the human-computer interaction portal includes a human-computer interaction interface on which feedback request information for the first video stream is displayed. The video streaming browser or application captures an image of the user face and/or gesture through an image capture module of the terminal device. In a case that the user acts an expression, a look or a gesture indicating to close the interface, or acts an expression, a look or a gesture indicating to ignore the feedback request information, the action serves as an instruction to close the human-computer interaction portal. Alternatively, the terminal device generates an instruction to close the human-computer interaction portal in response to the action. The video streaming browser or application closes the human-computer interface in response to the instruction. In another implementation, for example, the human-computer interaction portal includes a human-computer interaction interface on which feedback request information for the first video stream is displayed. The video streaming browser or application captures a user voice signal through a voice acquisition module of the terminal device and recognizes the voice signal to acquire a voice recognition result. In a case that the voice recognition result indicates to close the human-computer interaction portal or indicates to ignore the feedback request, the voice recognition result serves as an instruction to close the human-computer interaction portal. Alternatively, the terminal device generates an instruction to close the human-computer interaction portal in response to the voice recognition result, and the video streaming browser or application closes the human-computer interaction interface in response to the instruction. In one implementation, for example, the human-computer interaction portal includes a voice human-computer interaction speech module. The human-computer interaction speech module is invoked to play the feedback request information in the form of voice for the first video stream and to capture a user voice signal in order to recognize the voice signal to acquire a voice recognition result. In a case that the voice recognition result indicates to close the human-computer interaction portal or indicates to ignore the feedback request information, the voice recognition result serves as an instruction to close the human-computer interaction portal. Alternatively, the terminal device generates an instruction to close the human-computer interaction portal in response to the voice recognition result, and the video streaming browser or application closes the human-computer interaction portal in response to the instruction. In an implementation, for example, the human-computer interaction portal includes a voice human-computer interaction speech module. The voice human-computer interaction speech module is invoked to play a feedback request information in the form of voice for the first video stream. The video streaming browser or application captures an image of the user face and/or gesture via an image capture module of the terminal device. In a case that the user acts an expression, look or gesture indicating to close the interface, or acts an expression, look or gesture indicating to ignore the feedback request information, the action serves as an instruction to close the human-computer interaction portal. Alternatively, the terminal device generates an instruction to close the human-computer interaction portal in response to the action, and the video streaming browser or application closes the human-computer interaction portal in response to the instruction.

After the user inputs the target feedback information and submits the inputted target feedback information, the terminal device acquires the target feedback information through the human-computer interaction portal. Accordingly, the acquisition of the target feedback information may be considered as an instruction to close the human-computer interaction portal. Alternatively, the terminal device generates an instruction to close the human-computer interaction portal in response to this acquisition, and the video streaming browser or application closes the human-computer interaction portal in response to this instruction.

In a case that the user neither inputs the target feedback information nor refuses to input the target feedback information, a wait is set in order not to affect the video streaming. If the wait expires, the human-computer interaction portal is closed and the video stream is resumed playing. In this case, the wait timeout serves as an instruction to close the human-computer interaction portal. Alternatively, the terminal device generates an instruction to close the human-computer interaction portal in response to the wait timeout, and the video streaming browser or application closes the human-computer interaction portal in response to the instruction.

As described above, the second video stream different from the first video stream may be played in a manner that includes, but is not limited to, automatically playing the second video stream in response to acquisition of the target feedback information or the instruction to close the human-computer interaction portal.

In the method according to the embodiment of the present disclosure, the video stream is resumed playing in response to the acquisition of the target feedback information or the instruction to close the human-computer interaction portal. That is, the application automatically plays the second video stream after the user inputs the target feedback information and submits the target feedback information or closes the human-computer interaction portal, thereby achieving a seamless transition between human-computer interaction and automatic continuation of playing as well as improving the smoothness of video playing.

On the basis of any one of the described method embodiments, the second video stream played and/or at least one video stream played is determined based on the target feedback information.

In one implementation, the second video stream to be played and/or the at least one video stream to be played are determined by the present terminal device based on the target feedback information. Accordingly, in the method according to embodiments of the present disclosure, the target feedback information may be inputted into a pre-trained video stream recommendation model, and the second video stream to be played and/or the at least one video stream to be played may be determined based on an output of the video stream recommendation model. The terminal device plays the determined second video stream to be played and/or the at least one video stream to be played after acquiring the target feedback information through the human-computer interaction portal or receiving the instruction to close the human-computer interaction portal. In another implementation, the terminal device sends the acquired target feedback information to a network device in real time. The network device or other terminal device (to which the network device forwards the target feedback information in real time) determines the second video stream to be played and/or the at least one video stream to be played and sends the determination to this terminal device in real time. This terminal device plays the determined second video stream to be played and/or the at least one video stream to be played after acquiring the target feedback information through the human-machine interaction portal or receiving the instruction to close the human-machine interaction portal.

In one implementation, the video stream to be played is maintained through a video stream sequence and the video stream to be played in the video stream sequence is pre-loaded. After acquiring the video stream to be played (including the second video stream and/or at least one video stream to be played afterwards) determined based on the target feedback information, the terminal device may add the acquired video stream to the video stream sequence. The terminal device may add the acquired video stream to be played to the forefront of the video stream sequence so as to play the video stream in priority. In another implementation, the terminal device determines and loads the video stream to be played in real time rather than maintains the video stream to be played through the video stream sequence or even pre-loads the video stream to be played. When acquiring the video stream to be played determined based on the target feedback information, the terminal device loads and plays the video stream in real time.

In the method according to an embodiment of the present disclosure, the video stream recommendation is performed in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

In addition, in the method according to the embodiment of the present disclosure, it is necessary to acquire richer feedback content in order to make video stream recommendation in real time based on the target feedback information. For example, multiple feedback questions are set or multiple options are set for a feedback question, which requires a relatively larger display area. As described above, in the method according to the embodiment of the present disclosure, the playing of the video stream is stopped when the human-computer interaction portal is invoked. Therefore, in the case where the human-computer interaction portal is a human-computer interaction interface, the playing effect of the video stream is not affected by blocking the video stream being played even if a relatively large human-computer interaction interface is displayed.

On the basis of any one of the method embodiments, the trigger condition for invoking the human-computer interaction portal may include at least one of: a video stream switching instruction is received; the number of times that the first video stream is played repeatedly reaches a threshold; playing of the first video stream is finished already; a specific target object is detected during the playing of the first video stream; and the first video stream is played to a certain time instant.

In practice, the method according to the embodiment of the present disclosure supports flexible configuration of the trigger condition for invoking the human-computer interaction portal, so as to meet product requirements.

In one embodiment, the received video stream switching instruction may be configured as a trigger condition for invoking the human-computer interaction portal. When receiving the video stream switching instruction, the terminal device invokes the human-computer interaction portal in response to the instruction. This implementation of invoking the human-computer interaction portal not only does not interrupt the first video stream being played, but also reduces the interference to the playing of the video stream. The video stream switching instruction includes, but is not limited to: a touch gesture for instructing to switch the video stream, a voice instruction for instructing to switch the video stream, and a facial feature for instructing to switch the video stream.

In one embodiment, the completion of playing the first video stream may be configured as a trigger condition for invoking the human-computer interaction portal. When the playing of the first video stream is finished already, the terminal device invokes the human-computer interaction portal. This implementation of invoking the human-computer interaction portal not only does not interrupt the first video stream being played, but also reduces the interference to the playing of the video stream. In practice, the condition for the completion of playing the first video stream may be defined as required. Taking a short video as an example, the playing control logic of the short video is as follows. In a non-automatic playing mode, no switching instruction or other instruction for interrupting playing (such as an interface jump instruction) is received. When the first playing of the first video stream is finished, the terminal device automatically plays the current video repeatedly. In this case, it is defined that the completion of playing the first video stream refers to the completion of the first playing of the first video stream. In an automatic playing mode, no switching instruction or other instruction for interrupting playing (such as interface jump instruction) is received. When the first video stream is played this time, the terminal device automatically plays a next video. In this case, it is defined that the completion of playing the first video stream means that the current playing of the first video stream is completed.

Taking a short video playing application as an example, in the non-automatic playing mode, the playing control process of a video stream is commonly as follows. If no video stream switching instruction is detected, the current video stream is played repeatedly. When a video stream switching instruction is detected, the current video stream is switched to a next video stream. For the scenario where the current video stream is played repeatedly with no video stream switching instruction being received, the repetition of the current video stream may be resulted from that the user attention is diverted and the user forgets to switch or close the video stream rather than means that the user is more interested in the content of the video stream. In this case, the number of repetitions of the first video stream reaching the threshold may also be configured as the trigger condition for invoking the human-computer interaction portal. If the number of times that the first video stream is played repeatedly reaches the threshold, the terminal device requests the user feedback information about the video stream by invoking the human-computer interaction portal. This can not only improve the accuracy of the feedback information, but also improve the accuracy of subsequent use of the feedback information, for example, improve the accuracy of video stream recommendation based on the feedback information provided by the user.

In one embodiment, the detection of a specific target object during the playing of the first video stream may be configured as a trigger condition for invoking the human-computer interaction portal, so that the feedback information can be acquired for the specific target object in the video stream. In one embodiment, the terminal device detects in real time whether the specific target object is included in the video stream that is currently played. When the specific target object is detected during the playing of the first video stream, the human-computer interaction portal is invoked to acquire the user target feedback information. In the method according to the embodiment of the present disclosure, the timing of determining whether the first video stream includes the specific target object is not limited. For example, it may be determined when the browser or application loads or starts playing the first video stream whether the first video stream includes the specific target object. In the method according to the embodiment of the present disclosure, the implementation manner for determining whether the first video stream includes the specific target object is also not limited. For example, the terminal device may read tag information of the first video stream, and determine whether the first video stream includes a specific foreground target according to the tag information.

In one embodiment, playing the first video stream to a specific time instant may be set as a trigger condition for invoking the human-computer interaction portal. For example, for a first video stream with a duration of t, the specific time instant may be set to 0.5 t. That is, when the first video stream is played to 0.5 t, the human-computer interaction portal is invoked to acquire the user target feedback information. It should be understood by those skilled in the art that the specific time instant may be set according to actual requirements, which is not limited in the present disclosure.

In addition, other trigger condition for invoking the human-computer interaction portal may be flexibly configured according to product requirements. For example, the following trigger condition for invoking the human-computer interaction portal are set, including: when a specified touch gesture is detected in a specified touch area, when a specified voice instruction is detected, when a specified facial feature is detected and the like, which are not limited in the present disclosure.

In order to control the frequency of acquiring feedback information so as to reduce the impact on the playing of the video stream, a prohibition time period is set during which the human-computer interaction portal is not invoked. Correspondingly, a current time instant being not within the prohibition time period is configured as a precondition that the trigger condition for invoking the human-computer interaction portal is satisfied.

Optionally, if the precondition that the trigger condition for invoking the human-computer interaction portal is satisfied includes: not within the prohibition time period. The method according to an embodiment of the present disclosure may further include: detecting a trigger event for the prohibition time period, and resetting a timer corresponding to the prohibition time period. If the timer does not time out, the current time instant is within the forbidden time period. If the timer times out, the current time instant is not within the forbidden time period.

The prohibition time period may include multiple time periods, each time period may correspond to a timer, and each time period may correspond to a trigger event.

In practice, the trigger event for the forbidden time period may be flexibly configured according to the product requirements. In an implementation, it is assumed that for the same viewing object, the human-computer interaction portal is invoked only once within X days to request the target feedback information. Correspondingly, the trigger event corresponding to the forbidden time period includes: resetting the timer corresponding to the time period after the target feedback information is acquired. In another implementation, it is assumed that for the same viewing object, the viewing object has not input the target feedback information for Y times in succession or accumulatively. Correspondingly, the trigger event corresponding to the forbidden time period includes: the number of times that no target feedback information is inputted in succession or accumulatively reaches a set threshold. Correspondingly, after each time the human-computer interaction portal is invoked, the counted value for no target feedback information is acquired in succession or accumulatively is increased if no target feedback information is acquired by invoking the human-computer interaction portal this time. When the counted value reaches the set threshold, the timer corresponding to the time period is reset.

In the method according to the embodiment of the present disclosure, whether the current time instant is within the prohibition time period is determined by determining whether the timer corresponding to the prohibition time period times out, which is implemented in a simple and effective manner. The timer is reset by detecting the trigger event corresponding to the prohibition time period, thereby ensuring that the timer accurately reflects the prohibition time period.

In addition to determining whether the current instant is within the forbidden time period by setting a timer, the forbidden time period may also be set by setting the identification information corresponding to the forbidden time period. In an implementation manner, it is assumed that for the same viewing object, the human-computer interaction portal is invoked only once within X days to request the target feedback information. Correspondingly, prohibition identification information is set, and the prohibition identification information indicates whether the target feedback information of the current viewing object has been acquired within a predetermined time period (for example, within X days). In another implementation, it is assumed that the same viewing object has not input the target feedback information for Y times in succession or accumulatively. Correspondingly, prohibition identification information is set, and the prohibition identification information indicates whether the current viewing object has not input the target feedback information for Y times in succession or accumulatively.

Figure 4:
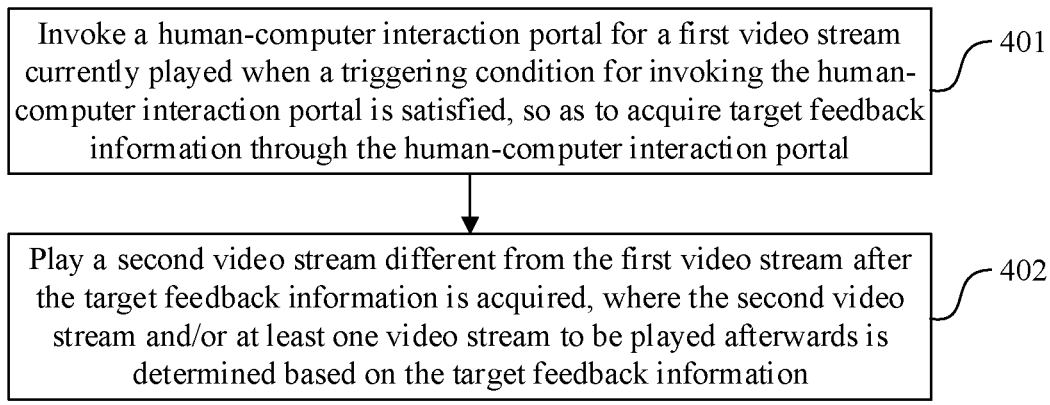
FIG. 4 is a flowchart illustrating a method for controlling playing of a video stream according to another embodiment of the present disclosure.

A method for controlling playing of a video stream is also provided according to an embodiment of the present disclosure. The method may be implemented by a terminal device installed with a browser or a video streaming application program. As shown in FIG. 4, the method includes the following steps 401 to 402.

In step 401, when the trigger condition for invoking the human-computer interaction portal is satisfied, the human-computer interaction portal for the first video stream that is currently played is invoked, so as to acquire target feedback information through the human-computer interaction portal. The target feedback information includes feedback information about the first video stream.

In step 402, a second video stream different from the first video stream is played after the target feedback information is acquired. The second video stream and/or at least one video stream to be played is determined based on the target feedback information.

In the method according to the embodiment of the present disclosure, video stream recommendation is performed in real time based on the target feedback information. The faster the operation speed of a recommendation model that is based on the target feedback information, the faster the video stream recommendation is performed based on the target feedback information in order to resumed playing the video stream, so as to improve the real-time performance and user experience of the video recommendation. If the human-computer interaction portal is invoked to acquire the user interest in the first video stream, the target feedback information truly reflects the user interest in the first video stream. Therefore, real-time video stream recommendation based on the target feedback information can also improve the accuracy of video recommendation.

Optionally, the implementation manner of playing the second video stream different from the first video stream after the target feedback information is acquired includes, but is not limited to: automatically playing the second video stream in response to acquisition of the target feedback information.

In the method according to the embodiment of the present disclosure, the second video stream is automatically played in response to acquisition of the target feedback information, which can realize seamless transition between the human-computer interaction and the operation of automatically playing the video stream, and improve the smoothness of video playing. Moreover, in a case that the second video stream is determined based on the target feedback information, the user feedback can be quickly responded according to the embodiments of the present disclosure, thereby further improving the user experience.

Optionally, in the method according to the embodiment of the present disclosure, the first video stream is stopped playing when the trigger condition for invoking the human-computer interaction portal is satisfied. Correspondingly, the implementation of invoking the human-computer interaction portal may include invoking the human-computer interaction portal while displaying the playing window of the first video stream. In addition, after receiving the instruction to close the human-computer interaction portal, the human-computer interaction portal is closed, and the second video stream is played.

In the method according to the embodiment of the present disclosure, the human-computer interaction portal for the first video stream is invoked to acquire feedback information while displaying the playing window of the first video stream, so as to acquire the user feedback on the first video stream that is currently played accurately and pertinently. In addition, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

For the specific implementation manner and details of the method, reference may be made to the description of the method embodiment, which are not repeated here.

Figure 5:
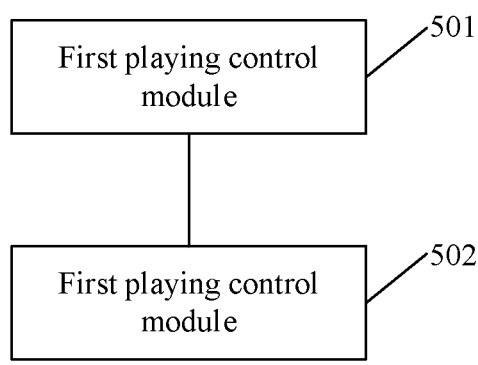
FIG. 5 is a block diagram illustrating a terminal device according to an embodiment of the present disclosure.

Based on the same inventive concept as the method shown in FIG. 1, a terminal device is provided according to an embodiment of the present disclosure. As shown in FIG. 5, the terminal device may include a first playing control module 501 and a second playing control module 502. The various components may respectively execute various steps/functions of the method for controlling playing of a video stream described above in conjunction with FIGS. 1 to 3. Only main functions of the components of the terminal device are described below, and the details that have been described above are omitted.

The first playing control module 501 is configured to stop playing a first video stream when a trigger condition for invoking a human-computer interaction portal is satisfied, and invoke the human-computer interaction portal for the first video stream while a playing window of the first video stream is displayed.

The second playing control module 502 is configured to close the human-computer interaction portal and play a second video stream different from the first video stream on receipt of a target feedback information through the human-computer interaction portal or an instruction to close the human-computer interaction portal. The target feedback information includes feedback information about the first video stream.

With the terminal device according to the embodiment of the present disclosure, the human-computer interaction portal for the first video stream is invoked while the playing window of the first video stream is displayed, to acquire feedback information, so as to accurately and pertinently acquire the user feedback on the first video stream that is currently played. Moreover, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

Optionally, the second playing control module plays the second video stream different from the first video stream in a manner that includes, but is not limited to, automatically playing the second video stream in response to acquisition of the target feedback information or the instruction to close the human-computer interaction portal.

The terminal device according to the embodiment of the present disclosure resumes playing the video stream in response to the acquisition of the target feedback information or the instruction to close the human-computer interaction portal. That is, the application automatically plays the second video stream after the user inputs the target feedback information or closes the human-computer interaction portal, thereby achieving a seamless transition between human-computer interaction and automatic continuation of playing as well as improving the smoothness of video playing.

On the basis of any one of the described terminal device embodiments, the second video stream played and/or at least one video stream played is determined based on the target feedback information.

The terminal device according to the embodiment of the present disclosure performs video stream recommendation in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

In addition, with the terminal device according to the embodiment of the present disclosure, it is necessary to acquire richer feedback content in order to make video stream recommendation in real time based on the target feedback information. For example, multiple feedback questions are set or multiple options are set for a feedback question, which requires a relatively larger display area. As described above, with the terminal device according to the embodiment of the present disclosure, the playing of the video stream is stopped when the human-computer interaction portal is invoked. Therefore, in the case where the human-computer interaction portal is a human-computer interaction interface, the playing effect of the video stream is not affected by blocking the video stream being played even if a relatively large human-computer interaction interface is displayed.

On the basis of any one of the terminal device embodiments, the trigger condition for invoking the human-computer interaction portal may include at least one of: a video stream switching instruction is received; the number of times that the first video stream is played repeatedly reaches a threshold; playing of the first video stream is finished already; a specific target object is detected during the playing of the first video stream; and the first video stream is played to a certain time instant.

In practice, the terminal device according to the embodiment of the present disclosure supports flexible configuration of the trigger condition for invoking the human-computer interaction portal, so as to meet product requirements.

In one embodiment, the terminal device may configure the received video stream switching instruction as the trigger condition for invoking the human-computer interaction portal. When receiving the video stream switching instruction, the terminal device invokes the human-computer interaction portal in response to the instruction. This implementation manner of invoking the human-computer interaction portal does not interrupt the first video stream being played, thereby reducing the interference to the playing of the video stream.

In one embodiment, the terminal device may configure the completion of playing the first video stream as the trigger condition for invoking the human-computer interaction portal. When the playing of the first video stream is finished, the terminal device invokes the human-computer interaction portal. This implementation of invoking the human-computer interaction portal does not interrupt the first video stream being played, thereby reducing the interference to the playing of the video stream.

Taking a short video playing application as an example, in the non-automatic playing mode, the playing control process of a video stream is commonly as follows. If no video stream switching instruction is detected, the current video stream is played repeatedly. When a video stream switching instruction is detected, the current video stream is switched to a next video stream. For the scenario where the current video stream is played repeatedly with no video stream switching instruction being received, the repetition of the current video stream may be resulted from that the user attention is diverted and the user forgets to switch or close the video stream rather than means that the user is more interested in the content of the video stream. In this case, in one embodiment, the terminal device may configure the number of repetitions of the first video stream reaching the threshold as the trigger condition for invoking the human-computer interaction portal. If the number of times that the first video stream is played repeatedly reaches the threshold, the terminal device requests the user feedback information about the video stream by invoking the human-computer interaction portal. This can not only improve the accuracy of the feedback information, but also improve the accuracy of subsequent use of the feedback information, for example, improve the accuracy of video stream recommendation based on the feedback information provided by the user.

In one embodiment, the detection of a specific target object during the playing of the first video stream may be configured as a trigger condition for invoking the human-computer interaction portal, so that the feedback information can be acquired for the specific target object in the video stream. In one embodiment, the terminal device detects in real time whether the specific target object is included in the video stream that is currently played. When the specific target object is detected during the playing of the first video stream, the human-computer interaction portal is invoked to acquire the user target feedback information. In the method according to the embodiment of the present disclosure, the timing of determining whether the first video stream includes the specific target object is not limited. For example, it may be determined when the browser or application loads or starts playing the first video stream whether the first video stream includes the specific target object. In the method according to the embodiment of the present disclosure, the implementation manner for determining whether the first video stream includes the specific target object is also not limited. For example, the terminal device may read tag information of the first video stream, and determine whether the first video stream includes a specific foreground target according to the tag information.

In one embodiment, playing the first video stream to a specific time instant may be set as a trigger condition for invoking the human-computer interaction portal. For example, for a first video stream with a duration of t, the specific time instant may be set to 0.5 t. That is, when the first video stream is played to 0.5 t, the human-computer interaction portal is invoked to acquire the user target feedback information. It should be understood by those skilled in the art that the specific time instant may be set according to actual requirements, and is not limited in the present disclosure.

In addition, other trigger condition for invoking the human-computer interaction portal may be flexibly configured according to product requirements. For example, the following trigger condition for invoking the human-computer interaction portal are set, including: when a specified touch gesture is detected in a specified touch area, when a specified voice instruction is detected, when a specified facial feature is detected and the like, which are not limited herein.

In order to control the frequency of acquiring feedback information so as to reduce the impact on the playing of the video stream, a prohibition time period is set during which the human-computer interaction portal is not invoked. Correspondingly, a current time instant being not within the prohibition time period is configured as a precondition that the trigger condition for invoking the human-computer interaction portal is satisfied.

Optionally, if the precondition that the trigger condition for invoking the human-computer interaction portal is satisfied includes: not within the prohibition time period. The method according to an embodiment of the present disclosure may further include: detecting a trigger event for the prohibition time period, and resetting a timer corresponding to the prohibition time period. If the timer does not time out, the current time instant is within the forbidden time period. If the timer times out, the current time instant is not within the forbidden time period.

Figure 6:
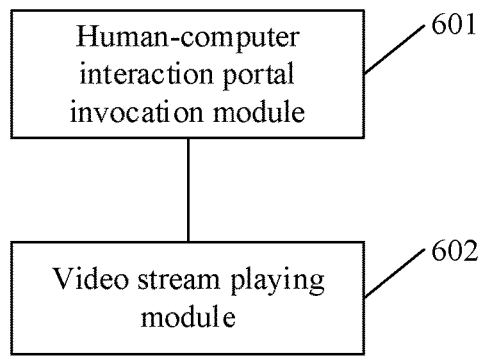
FIG. 6 is a block diagram illustrating a terminal device according to another embodiment of the present disclosure.

Based on the same inventive concept as the method shown in FIG. 4, a terminal device is provided according to an embodiment of the present disclosure. As shown in FIG. 6, the terminal device may include a human-computer interaction portal invocation module 601 and a video stream playing module 602. The various components may respectively execute various steps/functions of the method for controlling playing of a video stream described above in conjunction with FIGS. 2 to 4. Only main functions of the components of the terminal device are described below, and the details that have been described above are omitted.

The human-computer interaction portal invocation module 601 is configured to invoke a human-computer interaction portal for a first video stream that is currently played when the trigger condition for invoking the human-computer interaction portal is satisfied, so as to acquire target feedback information through a human-computer interaction interface. The target feedback information includes feedback information about the first video stream.

The video stream playing module 602 is configured to play a second video stream different from the first video stream after the target feedback information is acquired. The second video stream and/or at least one video stream to be played is determined based on the target feedback information.

The terminal device according to the embodiment of the present disclosure performs video stream recommendation in real time based on the target feedback information. The faster the operation speed of a recommendation model that is based on the target feedback information, the faster the video stream recommendation is performed based on the target feedback information when the video stream is resumed playing, so as to improve the real-time performance and user experience of the video recommendation. If the human-computer interaction portal is invoked to acquire the level of user interest in the first video stream, the target feedback information truly reflects the level of user interest in the first video stream. Therefore, real-time video stream recommendation based on the target feedback information can also improve the accuracy of video recommendation.

Optionally, the video stream playing module plays the second video stream different from the first video stream after the target feedback information is acquired in a manner including but not limited to: automatically playing the second video stream in response to acquisition of the target feedback information.

The terminal device according to the embodiment of the present disclosure automatically plays the second video stream in response to acquisition of the target feedback information, which can realize seamless transition between the human-computer interaction and the operation of automatically playing the video stream, and improve the smoothness of video playing.

Optionally, the video stream playing module further stops playing the first video stream when the trigger condition for invoking the human-computer interaction portal is satisfied. Correspondingly, the implementation manner of invoking the human-computer interaction portal by the human-computer interaction portal invocation module may include invoking the human-computer interaction portal while displaying the playing window of the first video stream. In addition, after receiving the instruction to close the human-computer interaction portal, the human-computer interaction portal vocation module closes the human-computer interaction portal, and the video stream playing module plays the second video stream. The target feedback information includes feedback information about the first video stream.

The terminal device according to the embodiment of the present disclosure stops playing the video stream (i.e., stops playing the first video stream) during the process of invoking the human-computer interaction portal, and automatically resumes playing the video stream (i.e., plays the second video stream) after closing the human-computer interaction portal. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

The modules may be implemented as software components executing on one or more general-purpose processors, or as hardware, such as programmable logic devices and/or application-specific integrated circuits, that perform certain functions or combinations thereof. In some embodiments, the modules may be embodied in the form of a software product. The software product may be stored on a non-volatile storage medium. The non-volatile storage medium includes a program for causing a computer device (e.g., a personal computer, a server, a network device, and a mobile terminal) to implement the methods described in the embodiments of the present disclosure. In one embodiment, the modules may be implemented on a single device, or distributed on multiple devices. The functions of the modules may be combined with each other or each may be split into multiple sub-modules.

The terminal device in the various embodiments may include a smart phone, a palmtop computer, a tablet computer, a wearable device with a display screen, an on-board computer, a smart speaker, a personal computer, and the like.

Those skilled in the art should clearly understand that, for the specific operation process of the modules of the terminal device described, reference may be made to the corresponding processes in the foregoing method embodiments for the convenience and brevity of the description, which are not repeated here.

Based on the same inventive concept as the method, an electronic device is also provided according to an embodiment of the present disclosure. The electronic device includes a processor and a memory.

The memory is configured to store programs for implementing the methods described in the various method embodiments. The processor is configured to execute programs stored in the memory. When program instructions stored in the memory are executed by the processor, the processor implements the methods described in the various method embodiments, and is further configured to implement corresponding modules in the terminal device according to the embodiments of the present disclosure. The processor may be a processing unit including a central processing unit (CPU) or other form of processing unit capable of processing data and/or executing instructions, and may control other components in the electronic device to perform desired functions. The memory may include one or more computer program products. The computer program product may include various forms of computer-readable storage media, such as a volatile memory and/or a non-volatile memory. The volatile memory may include, for example, a random-access memory (RAM) and/or a cache memory, or the like. The non-volatile memory may include, for example, a read only memory (ROM), a hard disk, a flash memory, and the like. One or more computer program instructions may be stored on the computer-readable storage medium. The processor may execute the program instructions to implement the functions of the embodiments of the present disclosure described above and/or other desired functions.

In a case that the electronic device according to the embodiment of the present disclosure implements the method shown in FIG. 1, the human-computer interaction portal for the first video stream is invoked while the playing window of the first video stream is displayed, to acquire the feedback information, thereby acquiring the user feedback on the first video stream that is currently played accurately and pertinently. Moreover, during the process of invoking the human-computer interaction portal, the playing of the video stream is paused (i.e., the first video stream is stopped playing), and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

In a case that the electronic device according to the embodiment of the present disclosure implements the method shown in FIG. 5, the video stream recommendation is performed in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

Figure 7:
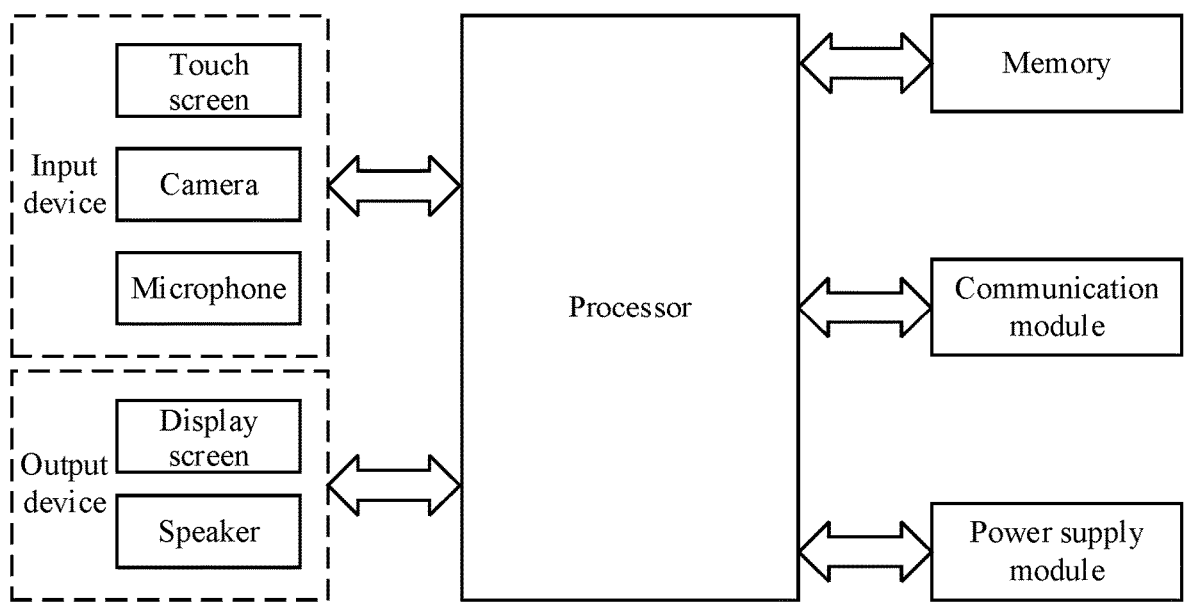
FIG. 7 is a schematic structural diagram illustrating an electronic device according to an embodiment of the present disclosure.

The electronic device according to the embodiment of the present disclosure may include a terminal device. As shown in FIG. 7, the terminal device includes not only a processor and a memory, but also an input device (such as a touch screen, a camera, and a microphone), an output device (such as a display screen, and a speaker), a communication module, and a power supply module.

The memory, the input device, the output device, the communication module, and the power supply module are connected to the processor through a serial port, a bus or a USB interface. For a single-processor terminal device, the processor is the CPU (central processing unit). For a dual-processor terminal device, the processor includes a master processor and a slave processor. The master processor runs an application program to implement the method according to the embodiment of the present disclosure. The slave processor controls the communication module to cooperate to implement communication with the outside. For a terminal device includes a GPU (graphics processing unit) and a CPU, the processor includes the GPU and the CPU. The methods according to the embodiments of the present disclosure are implemented by the GPU and the CPU in cooperation or by the CPU alone.

The memory of the terminal device may include, but is not limited to, a flash memory, a RAM (random-access memory), a ROM (read only memory) and the like. The RAM is mainly configured to store programs and data when the terminal device is running. The program to be executed or the data to be processed must be loaded into the RAM first. The ROM is mainly configured to check the configuration of an operating system of the terminal device and provide the most basic input and output (I/O) programs. The flash memory is a long-life non-volatile (retains stored data information in the event of a power failure) memory. Data deletion is in units of fixed blocks rather than single bytes. Since the flash memory still stores data during power failure, the flash memory is usually configured to store setting information, such as the setting information of the user on the mobile phone.

It should be noted that a terminal device (such as a single-processor smartphone, a dual-processor smartphone, a smart wearable device, and a tablet computer,) may include more or less hardware structures than the terminal device shown in FIG. 7. However, a terminal device including a memory and a processor and capable of implementing the functions of the method embodiments should falls within the protection scope of the present disclosure.

Based on the same inventive concept as the method, a computer-readable storage medium storing a program for executing the method in the various embodiments is further provided according to an embodiment of the present disclosure.

In a case that the program stored in the computer-readable storage medium according to the embodiment of the present disclosure implements the method shown in FIG. 1, the playing of the video stream is paused (i.e., the first video stream is stopped playing) during the process of invoking the human-computer interaction portal, and the video stream is resumed playing (i.e., the second video stream is played) after the human-computer interaction portal is closed. Even if the human-computer interaction portal blocks the playing window of the first video stream, the playing effect is not affected by blocking the video stream that is currently played because the playing of the first video stream is stopped during this process. In addition, the playing window of the stopped first video stream is still displayed since the first video stream is stopped playing, thereby prompting the user that the invoked human-computer interaction portal is for the first video stream, and the prompt is intuitive and simple.

In a case that the program stored in the computer-readable storage medium according to the embodiment of the present disclosure implements the method shown in FIG. 4, the video stream recommendation is performed in real time based on the target feedback information. The faster the operation speed of the recommendation model based on the target feedback information, the faster the video stream recommendation is performed based on the target feedback information in order to resume playing the video stream, thereby improving the real-time performance of the video recommendation and the user experience. If the human-computer interaction portal is used to acquire the user interest in the first video stream, the target feedback information may truly reflect the user interest in the first video stream. Therefore, real-time video stream recommendation based on the target feedback information may also improve the accuracy of video recommendation.

The specification is described with reference to flowchart illustrations and/or block diagrams of methods, devices (systems), and computer program products according to embodiments in the specification. It should be understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, a special purpose computer, an embedded processor or other programmable data processing device to produce a machine, so that instructions executed by a processor of a computer or other programmable data processing device produce means for implementing the functions specified in a flow or flows of the flowcharts and/or a block or blocks in the block diagrams.

The computer program instructions may also be stored in a computer-readable memory capable of directing a computer or other programmable data processing device to function in a particular manner, such that the instructions stored in the computer-readable memory result in an article of manufacture including an instruction device. The instruction device implements the functions specified in a flow or flows in the flowcharts and/or a block or blocks in the block diagrams.

These computer program instructions may also be loaded onto a computer or other programmable data processing device so that a series of operational steps are performed on the computer or other programmable device to produce computer-implemented processing. Therefore, the instructions executing on a computer or other programmable device provide steps for implementing the functions specified in a flow or flows in the flowcharts and/or a block or blocks in the block diagrams.

Although preferred embodiments of this specification have been described, additional changes and modifications to these embodiments may made by those skilled in the art once the basic inventive concepts are known. Therefore, the appended claims are intended to be construed to include the preferred embodiments and all changes and modifications that fall within the scope of this specification.

It is apparent that those skilled in the art may make various changes and modifications to this specification without departing from the spirit and scope of this specification. Therefore, provided that these modifications and variations of the present specification fall within the scope of the claims of the present specification and their technical equivalents, the present specification is also intended to include these modifications and variations.

The invention claimed is:

1. A method for controlling video playing, comprising:
invoking a human-computer interaction portal while displaying a video playing window in which a first video is played, wherein the human-computer interaction portal is configured to acquire user feedback on the first video;
receiving feedback information associated with the first video through the human-computer interaction portal;
sending the feedback information associated with the first video to a pre-trained video recommendation model while the first video is displayed in the video playing window, wherein the pre-trained video recommendation model performs real-time video recommendation based on the feedback information associated with the first video;
receiving at least one second video determined based on an output of the pre-trained video recommendation model, wherein the at least one second video is different from the first video; and
presenting the at least one second video in the video playing window.

2. A terminal device, comprising:
a memory storing a program and a processor, wherein the program upon execution by the processor causes the processor to implement operations comprising:
invoking a human-computer interaction portal while displaying a video playing window in which a first video is displayed, wherein the human-computer interaction portal is configured to acquire user feedback on the first video;
receiving feedback information associated with the first video through the human-computer interaction portal;
sending the feedback information associated with the first video to a pre-trained video recommendation model while the first video is displayed in the video playing window, wherein the pre-trained video recommendation model performs real-time video recommendation based on the feedback information associated with the first video;
receiving at least one second video determined based on an output of the pre-trained video recommendation model, wherein the at least one second video is different from the first video; and
presenting the at least one second video in the video playing window.

3. A non-transitory computer-readable storage medium, storing a program that upon execution by a processor causes the processor to implement operations comprising:
invoking a human-computer interaction portal while displaying a video playing window in which a first video is played, wherein the human-computer interaction portal is configured to acquire user feedback on the first video;
receiving feedback information associated with the first video through the human-computer interaction portal;
sending the feedback information associated with the first video to a pre-trained video recommendation model while the first video is displayed in the video playing window, wherein the pre-trained video recommendation model performs real-time video recommendation based on the feedback information associated with the first video;

receiving at least one second video determined based on an output of the pre-trained video recommendation model, wherein the at least one second video is different from the first video; and presenting the at least one second video in the video playing window.

4. The method of claim 1, wherein the video playing comprises playing streamed video data.

5. The method of claim 1, further comprising:
stopping playing the first video during a process of invoking the human-computer interaction portal; and
continuing to display the video playing window while stopping playing the first video.

6. The method of claim 1, further comprising:
closing the human-computer interaction portal in response to receiving the feedback information through the human-computer interaction portal; and
automatically and directly playing the at least one second video in the video playing window.

7. The method of claim 1, wherein the human-computer interaction portal comprises a human-computer interaction interface, and wherein the method further comprises displaying the human-computer interaction interface by overlaying the human-computer interaction interface on the video playing window.

8. The method of claim 1, wherein the human-computer interaction portal comprises a human-computer interaction interface, and wherein the method further comprises:
reducing a size of the video playing window; and
displaying the human-computer interaction interface in a second area while displaying the size-reduced video playing window in a first area.

9. The method of claim 8, further comprising:
restoring the size of the video playing window when the at least one second video is played.

10. The method of claim 1, wherein the human-computer interaction portal comprises a human-computer interaction voice component, and wherein the human-computer interaction voice component is configured to play, acquire, and recognize voice signals.

11. The method of claim 1, further comprising at least one of:
automatically invoking the human-computer interaction portal in response to detecting a target object in the first video during playing the first video;
automatically invoking the human-computer interaction portal in response to detecting that the first video is played to a certain time instant;
automatically invoking the human-computer interaction portal in response to detecting a completion of playing the first video; or
automatically invoking the human-computer interaction portal in response to detecting that a number of repetitions of playing the first video reaches a threshold.

12. The terminal device of claim 2, the operations further comprising:
stopping playing the first video during a process of invoking the human-computer interaction portal; and
continuing to display the video playing window while stopping playing the first video.

13. The terminal device of claim 2, the operations further comprising:

closing the human-computer interaction portal in response to receiving the feedback information through the human-computer interaction portal; and
automatically and directly playing the at least one second video in the video playing window.

14. The terminal device of claim 2, wherein the human-computer interaction portal comprises a human-computer interaction interface, and wherein the method further comprises displaying the human-computer interaction interface by overlaying the human-computer interaction interface on the video playing window.

15. The terminal device of claim 2, wherein the human-computer interaction portal comprises a human-computer interaction interface, and wherein the operations further comprise:
reducing a size of the video playing window;
displaying the human-computer interaction interface in a second area while displaying the size-reduced video playing window in a first area; and
restoring the size of the video playing window when the at least one second video is played.

16. The terminal device of claim 2, the operations further comprising at least one of:
automatically invoking the human-computer interaction portal in response to detecting a target object in the first video during playing the first video;
automatically invoking the human-computer interaction portal in response to detecting that the first video is played to a certain time instant;
automatically invoking the human-computer interaction portal in response to detecting a completion of playing the first video; or
automatically invoking the human-computer interaction portal in response to detecting that a number of repetitions of playing the first video reaches a threshold.

17. The non-transitory computer-readable storage medium of claim 3, the operations further comprising:
stopping playing the first video during a process of invoking the human-computer interaction portal; and
continuing to display the video playing window while stopping playing the first video.

18. The non-transitory computer-readable storage medium of claim 3, the operations further comprising:
closing the human-computer interaction portal in response to receiving the feedback information through the human-computer interaction portal; and
automatically and directly playing the at least one second video in the video playing window.

19. The non-transitory computer-readable storage medium of claim 3, wherein the human-computer interaction portal comprises a human-computer interaction interface, and wherein the operations further comprise:
reducing a size of the video playing window;
displaying the human-computer interaction interface in a second area while displaying the size-reduced video playing window in a first area; and
restoring the size of the video playing window when the at least one second video is played.

20. The non-transitory computer-readable storage medium of claim 3, the operations further comprising at least one of:
automatically invoking the human-computer interaction portal in response to detecting a target object in the first video during playing the first video;
automatically invoking the human-computer interaction portal in response to detecting that the first video is played to a certain time instant;

automatically invoking the human-computer interaction portal in response to detecting a completion of playing the first video; or
automatically invoking the human-computer interaction portal in response to detecting that a number of repetitions of playing the first video reaches a threshold.

\* \* \* \* \*